Patented Feb. 22, 1938                                    2,108,922

UNITED STATES PATENT OFFICE 2,108,922

STABILIZATION OF OIL

Virgil C. Mehlenbacher, Chicago, Ill., assignor to Industrial Patents Corporation, Chicago, Ill., a corporation of Delaware No Drawing. Application November 5, 1936,
Serial No. 109,309

5 Claims. (Cl. 99—163)

This invention relates to an improved process of treating edible fats and oils and more particularly to a process of stabilizing shortening products against rancidity.

One of the objects of the invention is to provide a method for stabilizing edible fats and oils such as lard, beef fat, hydrogenated cottonseed oil, and other similar vegetable and animal fats and oils against rancidity.

Another object of the invention is to provide as an article of commerce an improved shortening product stabilized against rancidity.

For the purpose of illustration, but not by way of limitation, the invention is hereinafter described as practiced with a mixture of vegetable oils subsequently hydrogenated. The effect of various substances of a chemical nature in promoting or retarding the tendency of fats and oils to become rancid has been studied by numerous investigators, and it is known that the antioxidant effect of any given substance is not predictable from the behavior of other substances.

The present invention is based upon the discovery that the tendency of shortening to become rancid can be retarded by treatment with hydrogenated kapok oil. In practice, I have successfully stabilized shortening prepared from a mixture of vegetable oils by adding kapok oil to a mixture of vegetable oils to be hydrogenated and thereafter hydrogenating the mixture, resulting in an end product with greatly increased resistance to rancidity.

The following table sets out data on actual tests carried out to demonstrate the value of the present invention in the stabilization of mixed vegetable oils:

|  | Type I | Type II | Type III | Type IV |
|---|---|---|---|---|
| A. O. M. hours keeping | 25 | 56 | 79 | 163 |
| Do | 30 | 56 | 78 | 144 |
| Do | 33 | 42 | 62 | 177 |
| Do | 32 | 38 | 67 | 149 |
| Do | 33 | 50 | 76 | 150 |
| Do | 27 | 49 | 75 | 108 |
| Average | 30 | 48.5 | 72.8 | 148.3 |

The shortening types indicated in the foregoing table were as follows:

Type I.—Hydrogenated shortening, formula: All cottonseed oil or mixture of cottonseed oil and cottonseed stearin in any portions Type II.—Hydrogenated shortening, formula: 50% cottonseed oil, 25% cottonseed stearin, and 25% palm oil Type III.—Hydrogenated shortening, formula: 25% kapok oil, 25% cottonseed oil, 25% cottonseed stearin and 25% palm oil Type IV.—Hydrogenated shortening, formula: 50% kapok oil, 25% cottonseed stearin, and 25% palm oil The term A. O. M. refers to the active oxygen method for measuring the relative stability of fats and oil, which is in essence a procedure of blowing purified and washed air through definite amounts of the samples at a definite and standardized rate. The temperature is held constant and is such as to materially accelerate the incubation period. The formation of peroxide is measured quantitatively by iodometric methods, and the quantity and rate of formation of these is taken as an index of keeping quality or stability. The method and procedure have been well discussed in the literature and is generally accepted as being one of the most reliable methods available at the present time for obtaining a measure of fat and oil stability against rancidity.

In the stabilization of hydrogenated vegetable oils, I prefer to add refined kapok oil to a mixture of refined vegetable oils and then hydrogenate the mixture.

Although by way of illustration I have discussed mixtures of vegetable oils in describing my invention, it will be understood that the present invention is not limited to mixtures of vegetable oils but comprehends edible vegetable and animal fats and oils adapted for use as shortening and the like. The word "shortening" as used in this specification and the claims which follow is understood to include edible animal and vegetable fats and oils such as lard, beef fat, hydrogenated cottonseed oil, cottonseed oil, and the like.

I have found in practice that effective stabilization may be secured with varying amounts of kapok oil. It will be understood, of course, that some stabilization is secured with smaller amounts, and that the effect is progressive as the amount is increased.

I claim:

1. The method of stabilizing shortening which comprises adding thereto and thoroughly incorporating therewith a quantity of hydrogenated kapok oil.

2. The method of stabilizing shortening which comprises adding thereto and thoroughly incorporating therewith from 25 per cent to 50 per cent of hydrogenated kapok oil.

3. As an article of commerce, a shortening product stabilized against rancidity consisting of a large proportion of shortening and a complement of hydrogenated kapok oil.

4. As an article of commerce, a shortening product stabilized against rancidity consisting of 25 per cent to 50 per cent hydrogenated kapok oil and a complement of shortening.

5. The method of stabilizing vegetable shortening which comprises mixing kapok oil with other oils to be hydrogenated and thereafter hydrogenating the mixture.

VIRGIL C. MEHLENBACHER.